April 12, 1938.   W. P. STRONG ET AL   2,113,665
WINDOW CONSTRUCTION
Filed Aug. 3, 1936   2 Sheets-Sheet 2

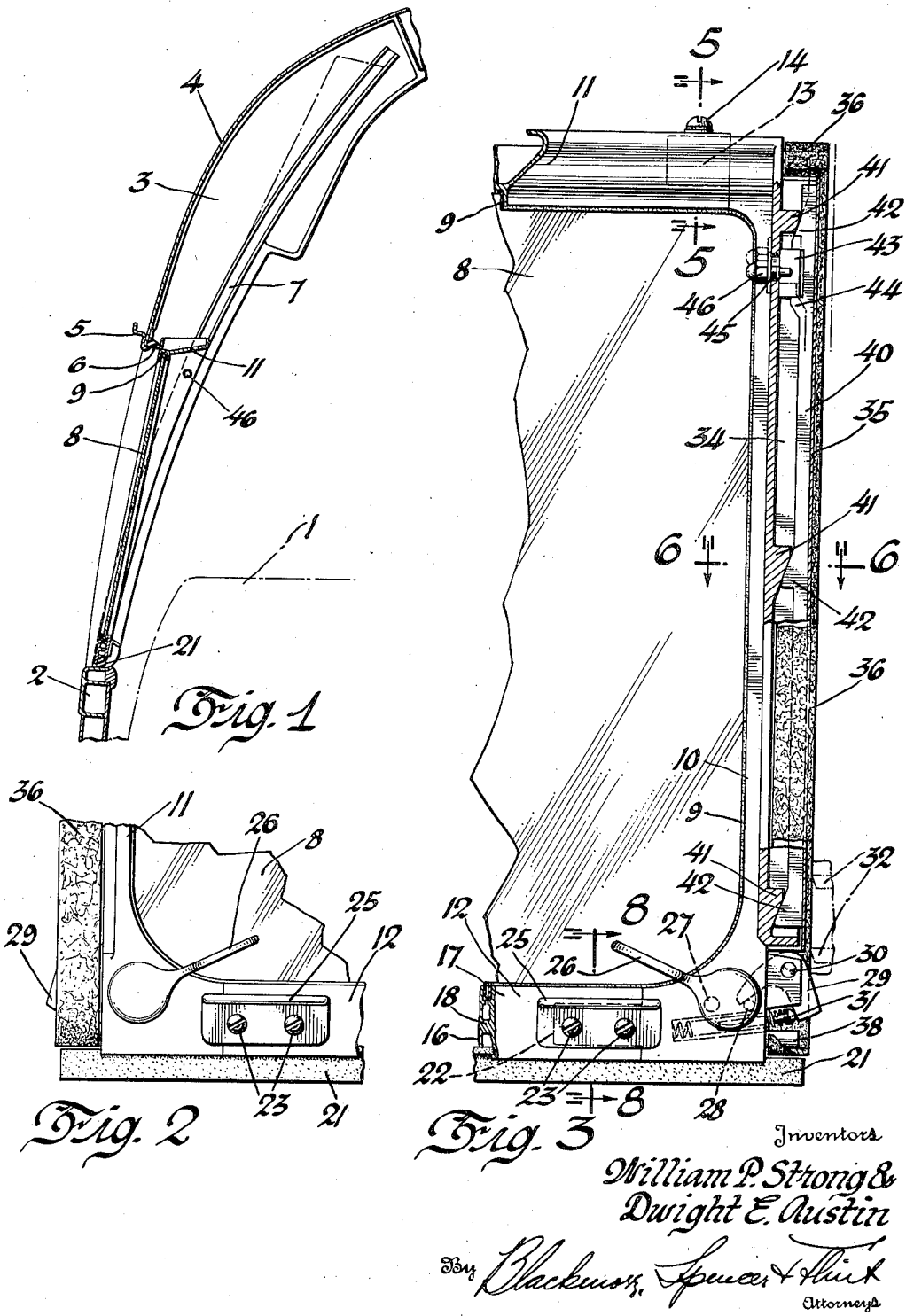

Inventors
William P. Strong &
Dwight E. Austin
By Blackmore, Spencer & Hink
Attorneys Patented Apr. 12, 1938

2,113,665

UNITED STATES PATENT OFFICE 2,113,665

WINDOW CONSTRUCTION

William P. Strong and Dwight E. Austin, Pontiac, Mich., assignors to Yellow Truck and Coach Manufacturing Company, Pontiac, Mich., a corporation of Maine Application August 3, 1936, Serial No. 93,975

9 Claims. (Cl. 296—44)

This invention has to do with the construction of sliding windows for motor coaches and the like and has been devised particularly for use in the vehicle body disclosed in pending application for patent Serial No. 64,255, filed February 17, 1936.

The vehicle in question has in the side wall a series of spaced roof supporting posts between which at the height of the heads of seated passengers are a succession of vertically slidable windows to be opened or closed as desired. In the region of the window openings, the side wall is inclined to the vertical and sweeps inwardly and above the window merges through a graceful curve into the arched roof. According to the present invention ample clearance for the sliding window in the curved side wall is provided through the use of arcuate guide tracks of uniform curvature, which allow free travel of the rigid window frame to and from its closed position, in which the window glass lies in the general plane of and substantially flush with the side wall without interference to passenger comfort.

Special attention has been given to the design of the window frame to enable the use of a flat pane of glass, to insure a weather-proof assembly, to reduce weight and cost, to obtain rigidity, to promote standardization and interchangeability of parts, to facilitate ease of operation, to secure positive latching of the window in any position of adjustment and to simplify fitting of the window upon original installation or subsequent adjustment in compensation for wear.

Figure 4:
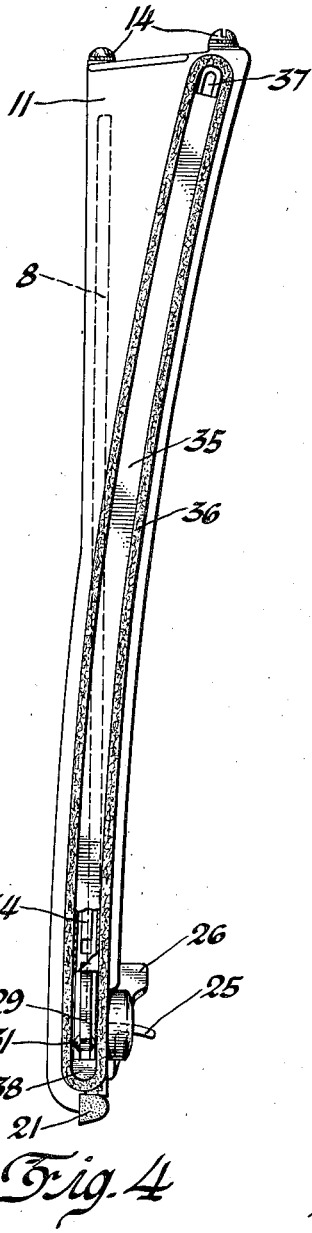
Figure 5:
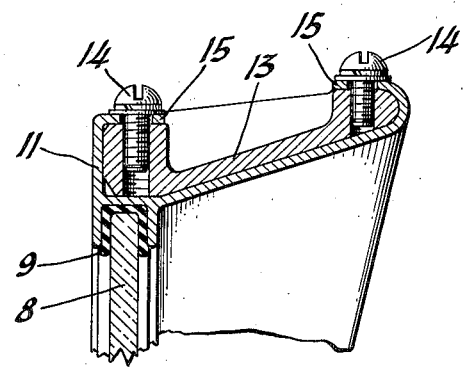
Figure 6:
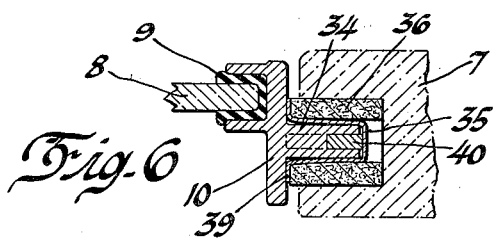
Figure 7:
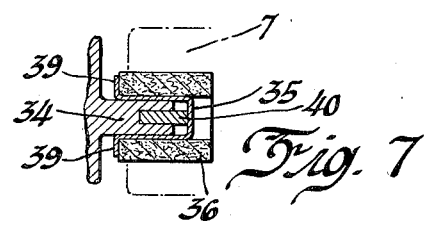
Figure 8:
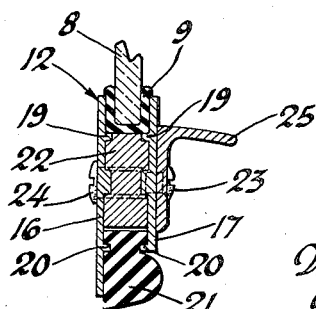

For a better understanding of the invention, reference can be made to the accompanying drawings, wherein Figure 1 is a transverse section of a portion of a vehicle body and one of the sliding windows; Figure 2 is an enlarged fragmentary view of the lower left-hand corner of the window assembly as viewed from the inside of the vehicle. Figure 3 is an enlarged view of the right-hand end of the window assembly; Figure 4 is an end elevation of the window frame; Figures 5, 6 and 8 are sectional views taken, respectively, on lines 5—5, 6—6 and 8—8 of Figure 3, and Figure 7 is a view corresponding to Figure 6 but showing the parts in a different position of adjustment.

Referring to the drawings, the numeral 1 indicates a portion of a passenger seat and 2 is the belt rail in the body side wall and defines the lower edge of the window opening. Extending upwardly from the belt rail 2 are a series of spaced curvilinear posts, one of which is indicated at 3 adapted for connection at its upper and inner end with roof supporting members. Carried by the post on the outer side is the curved panel 4 which may cooperate with or constitute a continuation of the roof sheathing, the lower edge defining the upper margin of the window opening and carrying on the outside a drip molding 5. Inwardly of the drip molding is a rubber flap 6 adapted for contact with the upper rail of the window frame to constitute a weather seal.

On adjacent faces of cooperating pairs of posts 3 are secured in proper alinement, the guide tracks for the sliding window. These tracks may each comprise a channel sectioned rail 7 extending in an arcuate path of uniform curvature from the belt rail 2 to the upper end of the post in spaced relation to the outer panel 4 to afford proper clearance for the window when raised to uncover to any desired extent the opening between the belt rail 2 and the drip molding 5.

The sliding window assembly includes a rectilinear frame so constructed as to provide arcuate ribs on each side to ride in the tracks 7 and to enable the use of a flat glass pane. The glass pane 8 has its edges fitted into channeled packings 9 of rubber or the like which in turn are retained within inwardly opening grooves provided on the rigid framing members. The right and left-hand framing rails 10 and 11 are similar in structure and each preferably is a casting of metal, such as aluminum alloy. Inturned feet at the top and bottom of the side rails are provided for a close nested fit within end recesses in both the top rail 11 and the bottom rail 12. The top and bottom rails are so designed that they can be readily formed by extruding suitable metal, such as aluminum alloy, and cut to predetermined lengths depending upon window width, the side rails being usable for any selected width. In the case of the top rail, this is shaped to the hollow cross section shown in Figure 5 to receive the correspondingly shaped foot 13 extending inwardly from the top of the side rail. By fitting the parts closely a mutual reinforcement is had which makes for rigidity and resists twisting or racking of the frame. Positive connection may be afforded by passing screw studs 14 through openings in the inturned upper flanges 15 of the rail 11 and into threaded engagement with alined apertures formed in the internested foot 13.

The bottom rail 12 in section is of substantially H-shape providing a pair of side walls 16 and 17 and a connecting web 18. On the side walls above and below the cross web 18, as seen in Figure 8, are the internal beads or ribs 19 and 20, the upper pair 19 of which provide the base of the groove which receives the glass edge packing 9. The lowermost pair of beads 20 afford interlocking tongues for retaining in place a weather sealing strip 21 which extends along the bottom of the window frame for sealing engagement with the belt rail 2 when the window is closed. At opposite ends of the rail 12 the central portion of the web 18 is cut away for interlocking engagement with cooperating recesses formed on the lowermost foot 22 on each side rail. In section this foot 22 is substantially I-shape as seen in Figure 8 and its close nested relation with the rail affords a rigid connection. For holding the parts together alined apertures are provided in the side walls 16 and 17 and the foot through each set of which extend a screw stud 23 and a sleeve nut 24, which also hold in place the lift handle 25 on the inside of the frame assembly.

Closely adjacent to the lift handle 25 for convenient manipulation is the swinging end 26 of the latch operating lever which is pivotally mounted on a pin 27 to the lower corner of the side rail. At spaced relation to the pivot pin 27 is an operating pin 28 which extends inwardly from the lever through an elongated slot in the side rail for unlatching a spring pressed detent or pawl. This pawl comprises a U-shaped lever 29 pivotally mounted upon a pin 30 within a side opening recess, with one leg positioned in the path of the pin 28 and the other leg extended downwardly for engagement by a spring pressed plunger 31 contained within a drilled opening in the side rail. The plunger urges the pawl lever 29 outwardly into position to engage any one of a series of spaced abutments or stops as indicated at 32, for supporting the window at any desired height. Thus by lifting on the handles 25 the window may be raised to any height with the pawl automatically engaging the proper stop and supporting the window until such time as the lever 26 is depressed to retract the pawl against the spring plunger 31.

For locating the window frame slidably within the guide track 7 each side rail has an outwardly extending arcuate bead or ridge constituted by a longitudinally grooved rib 34 formed as an integral part of the rail and a channeled shoe 35 sleeved or telescoped over the rib. As a seal and anti-rattle bearing surface the sides of the shoe are covered by a suitable fabric webbing 36 which preferably is in the form of an elongated endless loop fitted at opposite ends over the rounded nose portions 37 and 38 of the rib 34. The innermost edge of the packing bears against outturned flanges 39 on the shoe and the channeled shoe is initially formed with the sides thereof slightly divergently related so that upon assembly they are crowded together and thus exert an outward force on the packing to maintain a firm contact between the packing and the guide track 7. Projecting inwardly from the base of the channeled shoe and preferably welded thereto is a locating tongue or cleat which extends into the longitudinal groove of the rib 34 for engagement with longitudinally spaced abutments which maintain the relatively movable parts in spaced parallelism. These spacer abutments may comprise outwardly extending bosses 41 integral with the side rails and enclosed within the longitudinal groove thereof. Each abutment boss is shown with an inclined camming face for slidable bearing engagement with similar cooperating camming surfaces on lugs 42 formed on the tongue 40, whereby upon relative longitudinal movement of the parts the shoe is caused to move in or out and carry with it, by reason of the end flanges 39, the packing loop 36. Through this adjustment of the parts the effective width of the window assembly may be varied within predetermined limits to fit the parts properly to the guide track 7 on the spaced posts 3 and thus take care of slight inaccuracies in manufacture and misalinement in use.

The adjustment for fitting can be accomplished without dismantling the parts and from the inside of the vehicle, by a clamping adjustment conveniently located near the top of the window assembly where it will be inconspicuous and yet readily accessible. It may include a key member 43 located between the uppermost lug 42 and a cooperating extension 44 and provided with an inwardly extending stud 45 which projects through a longitudinally elongated slot in the frame rail to receive a clamping nut 46. By backing off the clamping nut 46 a turn or so, the stud can be raised or lowered within the limits of the slot through which it projects, and this movement is transmitted by the key 43 to the tongue 40 for raising or lowering the same and simultaneously, through the interengagement of the cam surfaces on the bosses 41 and 42, move the shoe in or out as may be needed to effect the setting.

We claim:

1. In a vehicle body, a window frame construction including a pair of side rails adapted for sliding engagement with tracks and at least one comprising a pair of relatively movable members, cooperating spacing abutments on said members having camming surfaces slidably bearing one on the other for determining the spacing of said members, and means to lock the parts against sliding movement of the cam surfaces one on the other from a set relation establishing a sliding fit of the rails to the tracks.

2. A sliding window construction adjustable for width to take care of size variations of window openings, including a two part side rail, spaced camming abutments on one of said rail parts, cam engaging abutments on the other rail part to locate said parts in selective spaced relation upon relative longitudinal movement of the rail parts and means to secure said parts against relative longitudinal movement for sliding fit relation to a given window opening.

3. A window construction slidable in sash guides, including a window frame side rail having a side opening groove therein, a guide fitting member having a locating tongue projecting into said groove, cooperating abutments rigid with said tongue and with said rail within the groove, at least one of which is of cam formation whereby the spaced relation of the guide fitting member and side rail may be varied for a sliding fit to the guides through the relative longitudinal adjustment of the member and rail, and fastening means for securing together the guide member and side rail against relative longitudinal adjustment.

4. In a sliding window construction, a framing member having a longitudinally grooved rib projecting outwardly therefrom and longitudinally spaced camming bosses within the groove, a guide shoe fitted over said rib and provided with a locating tongue extending into said groove and having camming surfaces cooperatively engaged with said bosses, means located within said groove in keyed engagement with said tongue and provided with a projection extending through an elongated slot in the frame for moving the shoe longitudinally of the rib and varying the setting thereof through the cam engagement and means for clamping said projection to the frame for holding the parts in adjusted position.

5. In a sliding window construction, a framing member having a longitudinally grooved rib projecting outwardly therefrom and longitudinally spaced camming bosses within the groove, a guide shoe fitted over said rib and provided with a locating tongue extending into said groove and having camming surfaces cooperatively engaged with said bosses, longitudinally movable means engaging the shoe for shifting the position of the same through said cam engagement, and an endless cushioning loop fitting over opposite ends of the rib and covering the sides of said shoe.

6. In a sliding window construction, a window framing rail having a longitudinally grooved rib, a slidable shoe embracing said rib and having a locating tongue extending into said groove, means for varying the setting of the shoe on said rib, an elongated looped packing member receiving the shoe therein and extending along opposite sides thereof, and outturned flanges on the shoe bearing on an edge of the packing member to move the packing member therewith.

7. In a sliding window construction, a window framing rail having a longitudinally grooved rib, a looped packing member sleeved over the rib, an outwardly adjustable shoe of channel section interposed between the rib and said packing and straddling said rib, lateral flanges on the shoe bearing on the inner edge of the packing, a tongue on the shoe extending into the grooved rib and means engaging said tongue for setting the shoe and packing in adjusted relation on the rib.

8. In a sliding window construction, a window framing rail having a longitudinally extending rib, a channel sectioned shoe sleeved over the rib and provided with lateral flanges, a looped packing member sleeved on the shoe and engaged with said flanges for movement with the shoe, and means adjustably locating the shoe in selective positions relative to the rib.

9. A window assembly slidable in sash guides, including a sash rail having an outwardly projected rib, a guide fitting shoe embracing said rib, a spacer cam formation for adjusting the position of the shoe on the rib to fit the guide slidably, and means setting the shoe in selective relation to the sash rail in said sliding fit position.

WM. P. STRONG.
DWIGHT E. AUSTIN.